March 22, 1966 H. BENMUSSA ET AL 3,242,265

TELEPHONE SYSTEM WITH ELECTRONIC SELECTION

Filed April 24, 1962 4 Sheets-Sheet 1

Inventor
H. BENMUSSA
P. R. L. MARTY
S. KOBUS

By Phillip A. Weiss
Attorney

Inventor
H. BENMUSSA
P. R. L. MARTY
S. KOBUS
By Phillip A. Weiss
Attorney

TELEPHONE SYSTEM WITH ELECTRONIC SELECTION

Inventor
H. BENMUSSA
P. R. L. MARTY
S. KOBUS
By Phillip A. Weiss
Attorney

TELEPHONE SYSTEM WITH ELECTRONIC SELECTION

Filed April 24, 1962 4 Sheets-Sheet 4

Inventor
H. BENMUSSA
P. R. L. MARTY
S. KOBUS
By Philip A. Weiss
Attorney

United States Patent Office 3,242,265

Patented Mar. 22, 1966

3,242,265

TELEPHONE SYSTEM WITH ELECTRONIC SELECTION

Henri Benmussa, Meudon, and Pierre René Louis Marty and Stanislas Kobus, Paris, France, assignors to International Standard Electric Corporation, New York, N.Y., a corporation of Delaware Filed Apr. 24, 1962, Ser. No. 189,919

Claims priority, application France, Apr. 25, 1961, 859,831, Patent 1,297,158

10 Claims. (Cl. 179—18)

The present invention relates to a selection system for electrical circuits or equipment to be applied in particular to automatic telephone exchanges.

Numerous systems exist already, using electro-mechanical switching units in their selection chains; these switching units being made up of rotary selectors, relays, or even crossbar (multiswitch). The checking and control equipment units are generally realized by means of relays. Such systems give satisfactory operating results, but are not fast enough. This disadvantage in low speed becomes quite obvious when a call has to transmit through several exchanges. It was tried therefore to substitute these switching units and relays by electronic apparatus of practically instantaneous operation, such as diodes and transistors, but the quantity of such apparatus necessary in a connection network renders the cost of an installation rather prohibitive; and furthermore, a contact which is obtained by such electronic means seldom presents the qualities of a contact obtained by electro-mechanical switching units, which offers zero or infinite impedance according as to whether it is closed or open.

In greater detail, the present invention concerns a selection system which contains the advantages of the above mentioned first systems without showing any of the disadvantages. This result is obtained by using, in the connection network, inexpensive multiswitches of reliable operation—having already stood the test in existing exchanges—and by constituting the entire checking and control apparatus (markers) with electronic units. Since operation-time of a multiswitch electromagnet is not to be neglected, the routing of a call is accelerated by using a centralized marker system; the path which is to link both ends of the chain is first prepared by the marker—without having any multiswitch intervene; then, when the selection is accomplished, the connection is simultaneously caused in the multiswitches of the various stages. Special arrangements, bringing into play the properties of the transistors, enable to obtain rapid operation from multiswitch electromagnets—whilst limiting the current to reasonable intensity—thus accelerating the routing of the calls. Means are provided for reducing the current consumption to a very weak value during the full duration of the call-conversation.

The marker, being very fast, could all by itself handle the entire traffic of the connection network; two markers are provided for reliability purposes. Therefore, there is finally obtained a compact selection system of moderate cost price.

Because of its conception, the present system may operate with a variable number of selection stages. In some cases, all the stages will be used; in other cases a part of these stages could be eliminated according to nature of calls and the traffic to be handled. Of course, the shortest path will always be chosen among several possible paths. Such a putting to use of the system affords great flexibility.

The part, so-called "selection chain" has been described in patent application Serial No. 177,551, filed on March 5, 1962 entitled "Selection Systems" and assigned to the assignee of this invention. This latter invention concerns the so-called part: "junctor and register." The local junctor or feeder, inserted in-between the two selection chains—calling side and called-party side—current-feeds the subscribers' lines; holds in seized condition the selection chains; transmits and receives the various necessary signals while routing a call, during call-conversation and during the release. The outgoing junctor and incoming junctor fill—a similar function—one of the two selection chains being replaced by a circuit which is linked to a distant exchange. The register, temporarily associated with the junctor, receives the dialled number and retransmits the various selective indications to the local-selection chain, and, eventually, to the distant exchanges.

An object of the present invention is to provide new and unique junctors and registers for controlling the electronic selection of communication paths through connection networks comprising multiswitches.

Another object of the present invention is to provide junctors made up of a simplified electro-mechanical arrangement comprising, essentially, the line wires, the subscriber feeding relays as well as the relays which emit and receive the signals—as much from subscriber's side as from circuit side; the other functions, usually accomplished by the junctors, are transferred onto equipment common to the whole, or part, of the exchange junctors, and made up of electronic apparatus—such an arrangement enables to obtain, on one hand, an economical and good quality conversation-circuit, and on the other hand, great speed of operation.

According to another object of the present invention common control circuits and memories for the junctors are provided.

Yet another object of the invention is to provide a temporising (or delay) device in the junctor insuring the proper functioning of the receiving relay during lapse of time separating two successive scanning operations.

Still another object of the invention is to provide, among the common control equipment for the junctor a so-called junctor driver for controlling the junctors.

According to another feature of the invention, every register is essentially made up of a group of memories—some of these memories will enable the recording of state of operations (sequential switch), and the remaining memories will enable the recording of other items of information such as the telephone number of the called party, the subscribers' class or category, the number of the associated junctor, etc.; while a logic circuit, common to a group of registers, will take notice of various items of information delivered by the memories during a fraction of time of a given cycle, and will request any appropriate operations inside the junctor or register as well as make, then, the sequential-switch step forward; a same logic circuit working, successively, for all the registers of a group—thus, enabling to realize an appreciable economy of apparatus.

Another feature of the invention is to provide bi-stable circuitry for scanning the junction memory and the register memory.

According to another object of the invention, two elementary scanners are associated with junctor driver; the first one will energize one or several connection relays common to a sub-group of junctors and preparing thus the transmission of orders onto all the junctors of the sub-group; the second characterizing the nature of the order and causing its effective transmission onto the junctor; these arrangments enabling to simplify the links between junctor drivers assigned to a group of junctors and the junctors of that group.

According to another feature of the invention, the above explained operating process is applied in the case of a local call, when the register, before releasing, notifies the junctor that it has to take into charge the continuation of the operations and must start by sending the ringing current to the called subscriber's end.

In accordance with one embodiment of the invention a selection system for circuits or electrical equipment, such as those used for automatic telephone exchanges, is provided in which a junctor is made up of a simplified electromechanical arrangement comprising essentially the line wires, the subscribers' feeding relays as well as the relays that emit and receive the signals so much from subscriber end as from circuit end, the other functions normally carried out by the junctors being transferred, in common equipments, onto all or part of the exchange junctors; these equipments being realized by means of electronic components, the said arrangements enabling to obtain on one hand an economical call-conversation circuit of good quality, and on the other hand, a great operating speed.

These and other features of the invention will become apparent from the description that follows, in conjunction with the accompanying sheets of drawings comprising FIGS. 1 to 8 wherein.

*General description*

Figure 1:
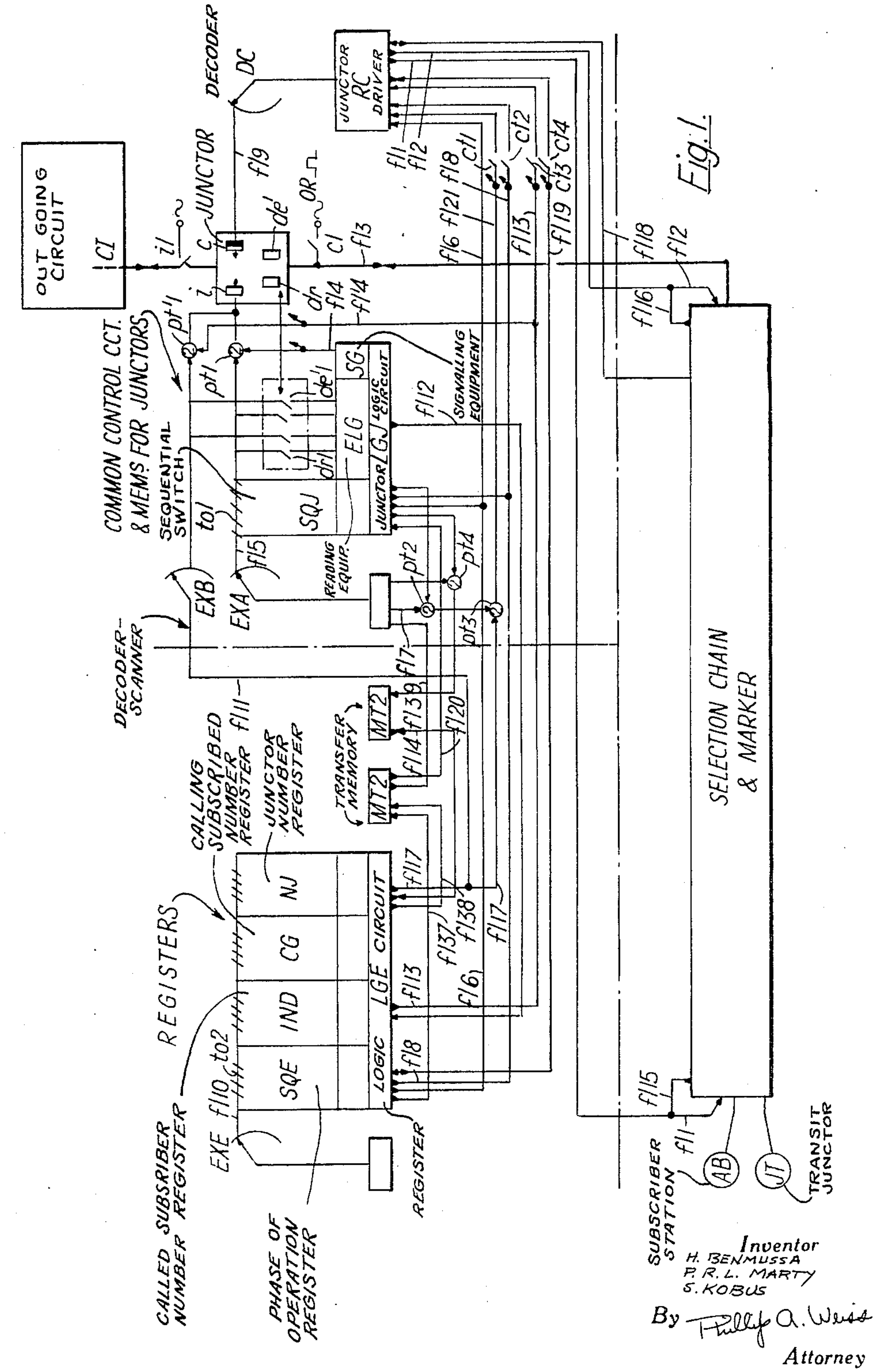
FIGURE 1 shows in block diagram form the general operations of the system.

Referring to FIG. 1, the manner in which are arranged the main units which make up the system; as well as the essential functions of each, will be described.

In the said FIG. 1, the equipment and the links used for the conversation currents are drawn on the diagram in thick line, in order to distinguish them more easily from the other elements of the diagram. The electronic gates are represented by means of circles of little dimension, containing an arabic numeral. The number 1 represents the "OR" gates and the number 2 represents the gates "AND." The ferrite tores, used as magnetic memories, are shown by small oblique strokes; the rectangles placed under these tores correspond to the reading and recording equipment. The scanners are schematically represented by rectangles associated with rotary switching units. Finally, the black band which is placed upon the lateral side of the relay *c* indicates that this is a memory relay; that is to say, it holds by simple remanence.

The subscriber AB can be linked, through a selection chain, to a junctor. The selectors used in this chain are realized by means of strong, reliable and economical apparatus—which operate very fast, such as cross-bar multiselectors. The unit or units liable to be linked at each end of the chain, are marked by means of wires such as *fl*1 and *fl*2. A common controlling device or marker hunts for an available routing path liable to link two units placed at both ends of the chain and marked by means of wires *fl*1 and *fl*2; it then controls the setting into place of the various selectors which correspond to that routing path. The marker is made up of electronic apparatus, the operating of which is practically instantaneous; the connection is simultaneously made in all the selectors of the chain, so that the period of duration for establishing a communication is very short. Thus is realized a system which presents the advantage of being at the same time reliable, rapid and economical. A selection chain of this type is described in the aforementioned co-pending application.

The junctor may be, according to the cases under consideration, a local junctor or a feeder, an outgoing junctor or incoming junctor. The feeder is used in the case of local calls; it is inserted in-between the two selection chains, calling side and called party side, it current-feeds the two subscribers and holds both these chains until release takes place. The outgoing junctor is associated with a circuit CI ending up onto a distant exchange; it is put into service in the case of an outgoing call, it feeds the calling subscriber, transmits and receives the various signals which are necessary for routing the call between the two exchanges. The incoming junctor performs similar functions, but in the case of incoming calls. Under such conditions, a local call uses a calling subscriber station AB; a first selection chain, a feeder, a second selection chain and a called subscriber station AB. An outgoing call uses: a calling subscriber station AB, a selection chain, an outgoing junctor and an outgoing circuit CI which may be a toll circuit, a trunk, or even a mere link onto a satellite exchange. Lastly, an incoming call uses an incoming circuit CI, an incoming junctor, a selection chain and a called subscriber station AB.

For transit calls, specialized junctors JT are provided and arranged in the same way as the subscribers with regard to selection chain; such a call uses therefore two chains, one for linking the incoming junctor to the transit junctor, and the other one for linking the transit junctor to the outgoing junctor.

The feeder or local junctor is simplified and includes some relays only:

(a) the usual standard, calling subscriber's feeding relay *dr*;

(b) the called party's feeding relay *dé*;

(c) relays such as *c* for controlling the dispatching of tones, ringing current and identification control signal (contacts *c*1).

The outgoing junctor is made up in similar manner, but the relay *dé* is utilized, not for feeding the called subscriber but for receiving the various signals originating from the distant exchange (invitation to transmit, availability or busy condition of called subscriber, reply, replacing of handset, etc.). This junctor includes, in addition, a relay *i* associated with a contact *i*1 for the despatching of signals onto the distant exchange (seizure, dialling, release, etc.).

The incoming junctor is made up in the same way as the feeder, but relay *dr* is used, not for feeding the caller but for receiving the various signals originating from the distant exchange. It includes in addition a relay *i* associated with a contact *i*1 for the despatching of signals onto that exchange.

In a general way, the relay *dr* characterizes—by its position—the state of the subscriber's line or of the circuit—calling side (line looped or open, presence or absence of a signal upon the circuit). Likewise, the relay *dé* characterizes—by its position—the state of the subscriber's line or of the circuit—called party side.

The junctors (local, outgoing, incoming) are linked to the selection chain by means of links *fl*3 which include three wires, that is, 2 wires for the conversation circuit and one wire for the identification of the various elements of the selection chains used for establishing a communication.

Therefore, there has been retained—in the feeder, outgoing junctor and incoming junctor—only those relays which transmit signals along the line wires, or which receive signals; the other functions taken up normally by these units have been concentrated, on one hand, in the memories or junctor circuits, and on the other hand in the junctor driver RC. The various junctors of the exchange are distributed into groups. Each group is associated, on one hand, with memories and junctor circuits, and on the other hand with a junctor driver RC essentially made up of electronic apparatus.

A certain amount of memories—that may be made up of ferrite tores *to*1 liable to record, each, a binary element of information or bit—are assigned to every junctor. If this amount is designated by *n*, it is possible to record on these memories $2^n$ distinct items of information. They are used, namely, to record the functioning stage of the junctor: rest condition, seizure, calling a register, sending the dialling tone, transmission of dialling impulses, etc. The rectangles, placed underneath these tores, correspond to the data reading and recording equipment. The entire arrangement, made up of tores *to*1 and of the said equipment, constitutes a real sequential switch which is designated on the drawing by SQJ.

For every junctor, two contacts *dr*1 are provided and controlled by relay *dr*, as well as two contacts *dé*1 controlled by relay *dé*. The equipment ELG enables to read the position of contacts *dr*1, that is to say, it enables to recognize the state of the subscriber's line, calling end (looped or open), or state of circuit, calling end (presence or absence of signal); likewise, it enables to read the position of contacts *dé*1, that is to say, to recognize the state of the subscriber's line or of the circuit placed at called party's end.

The signalling equipment SG has, as function, to place a given electrical characteristic along wire *fl*4 and to cause, thus, the energizing of relay *i* through the "AND" gate *pt*1. The relay *i*, by energizing, orders sending of a signal onto the distant exchange. There is one gate *pt*1 per each junctor: the wire *fl*4 is multiplied upon all those gates. The wire *fl'*4 and the gate *pt'*1 have, respectively, the same functions as wire *fl*4 and gate *pt*1, when the sending of signal is put under control of a register. There is one gate *pt'*1 per each junctor, and the wire *fl'*4 is multipled upon all these gates.

The ferrite tores *to*1, the left end contacts *dr*1, *dé*1, as well as the gate *pt*1 are scanned by the scanner EXA. The latter is made up of several bistable circuit stages of a well-known and currently used type. By using *m* stages, $2^m$ combinations are obtained. To the bistable circuits, which give the binary indications, there is added a decoding unit (so-called "decoder") which enables to make appear along wire *fl*5 an electrical characteristic—and one only—that characterizes a definite junctor. The entire arrangement of the scanner is shown, symbolically, on the drawing by a rectangle associated with a rotary switch, the rectangle representing the bistable circuits, whilst the rotary switch represents the decoder. The scanner EXA rotates permanently. When it passes upon a given position, the tores *to*1 as well as the contacts *dr*1, *dé*1, of the corresponding junctor are read simultaneously. The results obtained from these reading operations are communicated to the logic circuit LGJ—the latter will interpret same and will request, then, all the appropriate operations. Thus, for instance, if the logic circuit ascertains (or takes notice) that the sequential switch SQJ is in its position 0 (starting position) and that contact *dr*1 is closed, it deduces that the corresponding junctor has just been seized and consequently orders the calling for a register. It controls this function and then makes the sequential switch SQJ step forward by one step.

All the junctors of the group may therefore function in parallel according to the system so-called "Time-Division Multiplex System" in as much as a definite given period-of-time, inside a full cycle, is assigned to each one of these junctors.

The relay *i* receives orders from junctors or register-logic-circuits, for only a very short fraction of time of a full cycle duration of the scanners. In order to enable its holding into adequate position, between two successive scannings, a delay-device is associated with it—not shown on FIG. 1—and which is placed in the junctor.

The above described arrangement is particularly economical in as much as it allows the providing, for the group of junctors, of just a single set of reading and recording equipment, and, of just a single logic circuit, which acts in succession for the account of all the junctors.

The scanner EXA is used when the junctor functions alone, that is to say, without being associated with a register. When the junctor functions in conjunction with a register, a second scanner EXB is used which gives access to the right end contacts *dr*1, *dé*1, as well as to the gates *pt'*1. This scanner is constituted essentially by a decoder which is set into place by means of a code originating from the register.

The logic circuit LGJ working in succession for the account of all the junctors of a group, an operation started by the scanner EXA may be deferred by a lapse of time equal at the most to the duration of the cycle of that scanner. Practically speaking, this duration is slight, and the operation will not be delayed by an appreciable amount of time.

One or several junctor driver RC are provided for the entire junctors of the group; the main function of such a junctor driver is to order a number of operations which may eventually be deferred by some fractions of a second without any inconvenience; such is the case, for instance, of the sending of the dialling signal or of the ringing current. When an operation of this kind has to be effected by a given junctor, the logic circuit LGJ tests the junctor driver by means of a wire *fl*6; if this junctor driver is available, the said logic circuit associates with it be means of contacts *ct*1 and *ct*2 that can be realized by means of electronic gates. Two items of information are then transmitted to the junctor driver. The first item of information relates to the junctor number, it is generated by the bistable circuits of the scanner EXA and is transmitted through: wire *fl*7, "AND" gate *pt*2 unblocked by the logic circuit LGJ, "OR" gate *pt*3, wire *fl*21; and contact *ct*1. The second item of information concerns the order which has to be executed on the junctor under consideration; this item of information is generated by the logic circuit LGJ and received upon the junctor driver RC through wire *fl*8 and the contact *ct*2. By means of a decoder DC, shown symbolically by a rotary switch, an earth is applied along a given wire *fl*9 in order to energize, in the junctor under consideration, the relay *c* which must execute the order given. The junctor driver remains operating during the whole duration necessary for energizing the relay *c*; then, it releases and the relay *c* holds by mere remanence, or, by any other means.

The time necessary for energizing the relay *c* is rather important as compared to the duration of operation of an electronic apparatus; the junctor driver RC is therefore immobilized for a period of time which is not to be neglected. All the junctor drivers assigned to the junctors of the group can therefore be occupied during the scanning of the junctor under consideration. In this case, the scanning continues and the logic circuit starts once more the test at the next cycle. The energizing of the relay *c*, and subsequently, the executing of the order given, may be deferred by some fractions of a second, but, as has been already indicated, this is done without any inconvenience. As counter-part, it is not necessary to associate with the relay *c*, of each junctor, a delaying device—as in the case of relay *i*.

Several groups of registers are provided in the exchange, every group giving access to a group of junctors. The function of the register is to receive the dialled number and to control, consequently, the various selections. Every register comprises a certain number of ferrite tores *to*2. In register SQE there is shown the tores which indicate the phase of operation of the register; the rectangle placed underneath these tores corresponds to the reading and recording equipment. The tores used for receiving the called subscriber's number are represented in IND; those which receive the indication of the subscriber's lines category and the junctor number associated with the register, have been respectively designated by the references CG, NJ.

The tores *to*2 of the registers of a same group are scanned by the scanner EXE, which is made up of several bistable circuit stages and a decoder, as has been specified in respect of the scanner EXA. When the scanner EXE reaches onto level of wire *fl*10 which corresponds to a given register, all the tores of the said register are read simultaneously. The results obtained from this reading are communicated to the logic circuit LGE, the latter interprets them and orders all the appropriate operations and makes, then, the sequential switch SQE step forward by a step. As in the case of the junctors, the reading and recording equipment as well as the logic circuit are common to all the registers of the entire arrangement. These registers can therefore function in parallel according to the time-division multiplex system—a time-period position inside a cycle of positions being assigned to each one of them.

The associating of a junctor with a register is realized by the recording of this junctor number on tores NJ, and by the sending, upon the link *fl*11, of a code corresponding to the number of the junctor. When the register under consideration is scanned by scanner EXE, this code is transmitted to the decoder EXB so as to orient instantaneously the latter onto the required junctor. When the decoder EXB is set into place, the register and the junctor are both scanned by the corresponding reading equipment—and there may be an exchange of information between the logic circuit LGJ and the logic circuit LGE. Thus, for instance, during the phase of the calling subscriber's dialling operation, the reading takes place of the position of the right hand contact *dr*1; and retransmission of the corresponding indication along wire *fl*12. The logic circuit LGE interprets this information, in suitable manner; if it notices, for instance, that the contact *dr*1 remains open during a certain number of cycles of the scanner EXE, it concludes that a dialling impulse is being received and it starts an appropriate recording upon the tores IND. Likewise, when it is necessary to transmit a dialing impulse upon circuit CI, the logic circuit LGE sends an order to the relay *i* along wire *fl*13, along wire *fl'*4 and through gate *pt'*1—and that during several cycles of the scanner EXE, until relay *i* will have despatched the dialling impulse required. The duration of the cycle of scanner EXE is chosen slight enough for obtaining dialling impulses carefully calibrated.

Both scanners EXA and EXB are generally oriented (or routed) onto to two different junctors. Since the logic circuit LGJ may, at a given instant, act only ofr a single junctor, consequently, the time-period positions respectively assigned to the two scanners EXA and EXB must be different. In a more precise way, the scanner EXA gives the address of every junctor at regular intervals under the effect of the corresponding bistable circuits. But the scanner EXB must also give the address of a junctor under the effect of the code sent by the register along wire *fl*11, in order to enable the exchange of information between register and junctor; in this case, the junctor logic circuit is not used. It is essential therefore that places be spared, in-between the time-period positions which are reserved for the scanning by the junctor logic circuit; these places being meant for the scanning operations by the register logic circuit.

The timer period positions assigned respectively to the two junctor-scanners, are made to overlap; and periods are provided which comprise a timer-period position for the first scanner, and two or several time-period positions for the second scanner—this enables to scan the maximum number of registers in a given time; or enables to obtain, for scanning of a given amount of registers, a minimum cycle duration.

Figure 2:
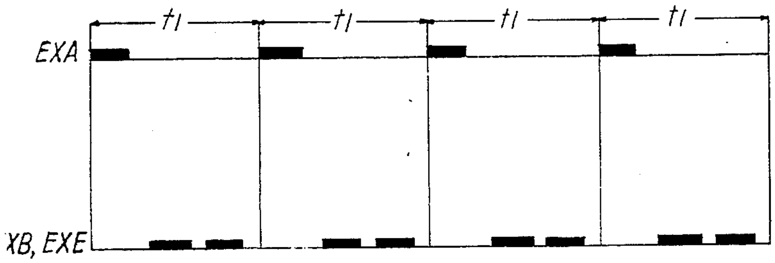
FIGURE 2 shows a time diagram of the operation of the various scanners.

On FIG. 2 there is shown, as an example, a diagram of time-period enabling to obtain this operation. Each period *t*1 includes three time-period positions, the first one assigned to scanner EXA and the other two to the scanners EXB, EXE. A short time interval can be provided in-between each of these positions in order to prevent any interference. As will be understood from this diagram, the scanner EXA serves a single junctor during each period *t*1, whilst the scanner EXB serves two registers during the same time; this arrangement enables to obtain for the scanner EXE a cycle of slighter time-duration for the same number of registers. The scanner EXA progresses step by step so as to scan in succession all the junctors of the group; likewise, the scanner EXE progresses forward step by step in order to scan in succession all the registers of the group; while on the other hand, the scanner EXB, instead of progressing step by step, is routed to one given junctor every time a register is to be scanned and is to give the order to the scanner to start scanning.

When a register is associated with a junctor, it will request an operation, which may be deferred for a fraction of a second without inconvenience, as sending of the dialling tone for instance, by choosing a junctor driver available among those assigned to the group of junctors, and by transmitting to it the junctor number as well as request of the operation to be executed—this junctor driver will store into memory the order given and will start hunting for the junctor so as to transmit to it this request.

The register logic circuit LGE may have access to the junctor driver RC in order to transmit to it orders, the execution of which could be deferred by a fraction of a second without any inconvenience. The logic circuit LGE effects the testing of a junctor driver by means of wire *fl*16; it transmits to it the junctor number through: the wire *fl*17, the "OR" gate *pt* 3 and contact *ct*1; the order being sent through wire *fl*18. The register, aware of the number of the junctor with which it is associated, effects a choice among the junctor drivers assigned to the group to which the junctor considered here belongs.

The transfer memory MT1 is provided for recording temporarily the number of the junctor that calls for a register. This number is communicated to it by the bistables of the scanner EXA through the "AND" gate *pt*4, unblocked by the logic circuit LGJ. When an available register is scanned, it examines—through the link *fl*14—whether there exists a junctor number recorded in the memory MT1. If so, the contents of the memory is transferred onto the tores NJ and this memory becomes once more available for recording the number of another calling junctor. It is possible, if required to provide several memories MT1 for one same group of junctors; it is just necessary to place in the logic circuit LGJ a device enabling to seek out an available memory when a junctor calls for a register.

When the junctor, in service, is associated with a register, a certain number of operations are ordered by the register and then executed by the junctor logic-circuit. Such is the case, for instance, of the sending of ringing current. The order is then recorded, as well as the junctor number, in a transfer memory MT2 (wires *fl*37 and *fl*38). When the junctor is scanned by EXA, the memory MT2 recognizes its number in the bistables of the scanner EXA (wire *fl*39); it retransmits then the order to the junctor logic-circuit LGJ over wire 120. The memory is liberated and may be used for recording another order. Of course, several transfer memories MT2 can be provided, if that is necessary.

The marker may have several items of information to communicate to the register (availability of called subscriber, end of the selection, etc.). When such an item of information is available, it is not possible to transmit it directly from marker to register, as it will be necessary to wait that the said register be scanned—which will lead to a busy-condition waiting period which is inadmissible for the marker. Therefore the junctor driver RC functions as a transfer memory. The item of information established by the marker is communicated to that register through wire *fl*18. This register possesses, in addition, the junctor-number which was communicated to it either by the logic circuit LGJ, or by the logic circuit LGE. By means of wire *fl*19, the logic circuit LGE scans the junctor driver RC with which it is associated. When it recognizes in this register the same number as the one recorded upon the tores NJ, it causes, on behalf of the junctor driver, the retransmission of item of information established by the marker, then it liberates the junctor driver.

The junctor driver RC is used also as a relay for the transmission of information from register to marker. Thus, for instance, the number of the primary selector associated with called-party-end of the feeder, as well as the number of the called subscriber, are transmitted from register to the junctor driver through wire *fl*13; the junctor driver makes use of these indications by marking both ends of the selection chain by means of wires *fl*1 and *fl*2. Of course, all this supposes that the junctor driver knows the number of the marker in service; it receives in good time this information from the register by any appropriate means.

*Local call.*—After having described in general the equipment, there will now be explained in detail the various operations concerning the case of a local call. The case of outgoing, incoming and transit calls will be the object of a subsequent patent addition.

When a subscriber AB makes a call, the marker is warned; it marks, on one hand, the said subscriber at one of two ends of the selection chain (wires *fl*15 and *fl*1) and, on the other hand, it marks all the local junctors or feeders available at the other end of the chain (wires *fl*16 and *fl*2). The marker then starts seeking for an available routing path liable to link the calling subscriber to one of these feeders, then it orders the simultaneous connection in all the selectors which correspond to that path. The various operations, relating to the seeking out of an available path and connection, have been already described in detail in the application for patent mentioned at the beginning of this description. The subscriber AB is then connected to the feeder through the selection chain and a link *fl*3.

The feeding relay *dr* is then looped through the caller's telephone set and it energizes; and that corresponds to the seizure of the feeder. Both contacts *dr*1 associated with the relay *dr* get into operating condition.

When the scanner EXA arrives on the feeder under consideration, the logic circuit LGJ ascertains by means of the reading and recording equipments ELG that the sequential switch SQJ is in position 0 (initial or starting position) and that the contact *dr*1 is closed. It deduces that the said feeder has just been seized and it orders the calling for an available register. For that purpose, it unblocks the "AND" gate *pt*4 so as to enable the recording in the transfer memory MT1 of position of the scanner EXA; that is to say, of the number of the feeder in its group. The logic circuit LGJ controls this recording by any appropriate means. Then is acts upon the reading and recording apparatus associated with the tores *to*1; the sequential switch SQJ passes on from position 0 to position 1.

From all the above explanations, it ensues that the logic circuit LGJ starts first by taking notice of the information recorded upon the sequential switch SQJ and the contacts *dr*1; it then acts by ordering a definite operation (recording of the feeder number in the transfer memory); it controls this operation, then makes the sequential switch step forward by a step. These various operations are accomplished by the logic circuit during the time-period assigned to the scanner EXA. This process will be repeated throughout the functioning of the system, every time the feeder is scanned.

When the scanner EXE arrives opposite an available register, the logic circuit LGE is notified by consulting the position of the sequential switch SQE (position 0=availability); it examines, by means of link *fl*14, the transfer memory MT1; and it ascertains that a junctor number is recorded in the said memory. This number is then transferred upon tores NJ. As has been mentioned, this recording characterizes the associating of the feeder with the register. The logic circuit LGE controls the recording of the junctor number upon the cores NJ by any appropriate means and then orders the passing of sequential switch SQE from position 0 onto position 1.

When the feeder is associated with the register, an identification operation is made to start. As was specified in the application for patent mentioned at the beginning of this description, the identification is obtained by dispatching along the third wire of the link *fl*3 an appropriate signal such as a positive impulse. This impulse propagates itself, along the third wire, through the entire selection chain; and it causes the apparition, upon identifiers, of the calling subscriber's category, and of the indication which enables to reconstitute the numbers of the various selectors used for establishing the connection. In the case under consideration here, the aim of this identification operation is to obtain the category of the calling subscriber in order to enable the register to route the call correctly.

When the register under consideration is scanned by scanner EXE, the logic circuit ascertains that the sequential switch SQE happens to be in position 1; it then chooses an available junctor driver serving the group to which the considered feeder belongs, and transmits to it an identification request as well as the junctor number (wires *fl*8 and *fl*17). The junctor driver RC, being in possession of both these informations orients (or directs) the decorder DC onto a position characterising at the same time the feeder considered and the request for identification; the relay *c* energizes and controls—through its contact *c*1—the sending of an identification impulse. The energizing of relay *c* may necessitate an appreciable amount of time, as compared with the duration of the functioning of an electronic apparatus; the register does not wait that the order be executed, it just verifies as to whether the order was correctly recorded, and then it orders the passing of the sequential switch SQE onto position 2.

The category of the calling subscriber is transmitted from marker to junctor-driver through wire *fl*18. When the register is scanned again, it examines the junctor driver RC via wire *fl*19, and recognizes in this junctor driver the number of the junctor already recorded upon the tores NJ; it causes then, on behalf of the junctor driver, the retransmission of the calling subscriber's category (wire *fl*19). This item of information is recorded upon the tores CG.

At the same time, the logic circuit LGE seizes an available junctor driver and transmits to it an order for the sending of the dialling tone as well as the junctor driver number. According to same process as the one described above, a relay *c* of the feeder energizes and requests through it contact *c*1 the sending of the tone. This request having been recorded in junctor driver RC, the logic circuit LGE causes the stepping forward of the sequential switch SQE onto position 3. It will be noted that the sending of the tone may take place even if the identification is not terminated.

The calling subscriber dials then, on his set, the telephone number of his party; and the relay *dr* operates.

It will be noted that the sending of the dialling tone must stop at this instant. Appropriate means being provided in the feeder either for making the relay *c* release, or for breaking the circiut of the dialing tone. In a general way, when an operation ordered by a relay *c* of the feeder must come to a stop, use is made of relays or any other appropriate means placed in the junctor itself. According to a variant it is possible to let the junctor driver intervene once more and to send along wire *fl*9 an impulse of adequate direction for de-magnetizing the relay *c*.

Figure 3:
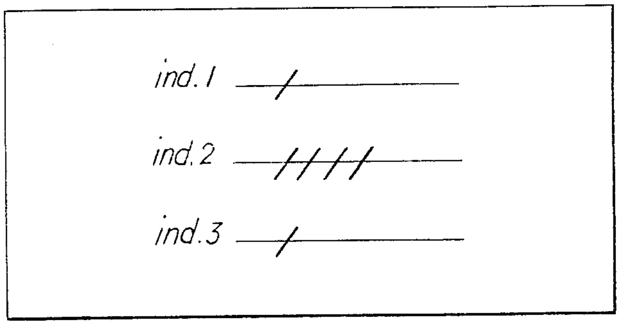
FIGURE 3 shows a signal detecting device.

When the register is scanned after transmission of order for sending the dialling tone, the logic circuit LGE ascertains that the sequential switch SQE happens to be in position 3, and transmits then to the scanner EXB, the feeder number recorded in NJ. The scanner EXB is orientated instantaneously upon the feeder considered here. By means of the reading equipment ELG, the logic circuit LGJ scans the state of the right end contact *dr*1 and re-transmits it to the logic circuit LGE through the wire *fl*12. The duration period of a dialling impulse is of about 66 milliseconds, while the period of a cycle of the scanner EXE is only of 8 milliseconds; this therefore leads to the necessity of scanning the contact *dr*1 during several successive cycles of the scanner EXE. In order to accomplish this operation, the signal detecting device represented on FIG. 3 is used.

The signal detecting device comprises a combination of three memories—the first memory is for recording, at each scanning operation, the state of the signal-receiving-relay contact (open or closed), the second memory is for counting the number of identifical states since last changement or "transition," the third memory is for indicating the direction of the counted states; when the logic circuit, during a scanning operation, takes notice of a transition, it does not take it into consideration but will limit itself to add a unit to the counting memory and bring up to date the first memory, but in case this logic circuit will notice, during the next scanning operation, that the changing of state of the contact persists, it will read the counting memory in order to deduce the nature of the signal received (caller's lifting of handset, dialling impulse, interval between dialling impulses, pause in-between trains of impulses, caller's replacing of handset, etc.), it makes the counting memory to retrogress so as to enable it to count the new states, and, it brings up to date the two other memories.

This device is essentially made up of a certain number of tores. The tore *ind*1 is used for recording the state of the scanned contact (closed or open). The *n* tores *ind*2 make up a counting chain enabling to record $2^n$ unities; their function is to count the amount of identical states found out since the last changement. Finally, the tore *ind*3 is provided for memorizing the nature of the states counted by the chain *ind*2 (closed or open).

When the amount of identical states "open" which has been read on the counting memory during dialling, is included in-between two predetermined limits *l*1 and *l*2, the logic circuit interprets the signal as being a dialling impulse; and that if this amount is lower than the lowest limit *l*1, the signal is interpreted as being a mere disturbing noise; and that if this amount is superior to the highest limits 12, the signal is interpreted as being a replacing of handset.

When the amount of identical states "closed" which has been read on the counting memory during the dialling is included in-between two predetermined limits *l*1 and *l*2, the logic circuit interprets the signal as an interval between two dialling pulses; and that if this amount is inferior to the lowest limit *l*1; the signal is interpreted as being a mere disturbing noise and that if this amount is superior to the highest limit *l*2, the signal is interpreted as being a pause between two trains of consecutive impulses or the end of dialling operation.

Figure 4:
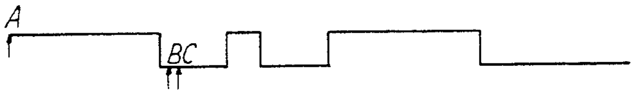
FIGURE 4 is a diagram useful in explaining the operation of the detecting device of FIGURE 3.

On FIG. 4 there is shown the diagram of the impulses furnished by the subscriber's calling dial. When the calling subscriber has not dialled yet, contact *dr*1 is closed and the operating point happens to be, for instance, in A. When this contact is scanned, the register logic circiut records the "closed" state upon the tores *ind*1, *ind*3 and makes the counting chain *ind*2 progress forward onto position 1. As long as the subscriber does not dial, the contact *dr*1 is closed; the tores *ind*1 and *ind*3 remain in the position under consideration, but the counting chain *ind*2 effects a step forward at each new scanning.

At the beginning of the first dialling impulse, the contact *dr*1 is open, and the operating point happens to be in B. The register logic circuit, knowing the position of the tore *ind*3, takes notice that the contact *dr*1 has changed position. However, this changement of position, or "transition," is not taken into consideration, since it might result from a line noise (or disturbance noise, or parasitic) or from an accidental cutting of the line; the register logic-current only records the state "open" upon the tore *ind*1 and makes the counting chain *ind*2 progress forward by a step.

During the next scanning operation, the operating point happens to be in C; the register logic-circuit takes notice again that the contact *dr*1 is open. In comparing this information with state of the tores *ind*1 and *ind*3, it deduces that the contact *dr*1 happens to be open for the second time and that this is not the case of a line noise or of an accidental cutting of the line. It starts then the reading of the counting chain *ind*2 in order to draw all useful conclusions. In the case under consideration here, this chain indicates a number which is higher than a given limit—higher than twelve, for instance; the logic circuit deduces that the subscriber's line was looped before the transition and therefore happened to be in awaiting-of-dialling position. It records the "open" condition (or state) upon the tore *ind*1; it makes the counting chain *ind*2 step backwards onto position 2, since it has just been ascertained that two identical "open" states are present; finally, it records the nature of the counted states (open) upon tore *ind*3.

The process of operation goes on in the same way; the interpreting of the indications read upon the counting chain *ind*2 being accomplished in the following manner: in order that a dialling impulse be taken into consideration, it is necessary to find out an amount of consecutive openings included between 3 and 12. If this amount is lower than three, it is most likely a case of an accidental cutting of the line; if it is higher than 12, it means that the subscriber has replaced his handset. The interpreting of the closures is made in likewise manner. If the amount of consecutive closures is included between 3 and 12, it is deduced that this is an interval between two dialling impulses; if this amount is lower than 3, then it is the case of a mere line noise; finally, if it is higher than 12, it is a pause between two trains of consecutive impulses or the end of the dialling operation.

In the case of a line noise the register logic-circuit takes notice—during the second scanning which follows the transition—that the condition which was scanned has changed as compared with the condition which was scanned during the preceding cycle, but is identical to the condition of the tore *ind*3. It deduces that this is not the case of a true transition, and will limit itself in bringing up to date the tore *ind*1 whilst adding an additional unit to the counting chain.

This process of testing the line affords a good reliability in the receiving of impulses, a minimum of three successive identical observations being necessary in order that new condition of the line be taken into consideration.

There is provided, in the tores IND of the register (FIG. 1), a chain for counting the impulses of each train. As soon as the logic circuit takes notice of the end of the train of impulses, it transfers the digit which is recorded upon that chain onto an appropriate memory—the said chain being then able to be utilized once more for counting the impulses of the next train. Of course, there are provided as many memories as there are digits to be registered.

When the register takes notice—by analysing the dialled office code, that this is a local call, it keeps waiting until the full telephone number has been dialled. The sequential switch SQE will then progress forward onto position 4.

As the register is scanned at the next cycle, the logic circuit—upon noticing the position of the sequential switch SQE—seizes an available junctor driver RC and transmits to it the called subscriber's telephone number through wire *fl*13. In the same way as for the preceding cases, it also transmits to it the number of the feeder through wire *fl*17 and gate *pt*3. Finally, it transmits to it an order—so called "line called" (wire *fl*8). After having checked, by every appropriate means, that these items of information have been duly recorded in the junctor driver RC, the logic circuit orders the stepping forward of the sequential switch SQE onto position 5.

The junctor driver RC, being in possession of these various items of information, marks the called party upon one of the ends of the selection chain by means of wire *fl*1. A translator, not shown in FIG. 1, associated with the selection chain, enables to make the necessary translations, that is to say, to make correspond to the dialled number a position chosen in advance upon the banks of the selectors.

The junctor driver RC will then orientate the decoder DC onto a relay *c* of the feeder—so as to start an identification operation according to a process already described above. In the case under consideration here, the identification impulse is sent upon the link *fl*3 which is connected to the selector associated to called party side of the feeder. The number of this selector is therefore made to appear in the marker. Then, this selector is marked at the right end of the selection chain, by means of wires *fl*16 and *fl*2.

The marker then proceeds with the finding out of a available routing path between called party and primary selector associated with called party side of the feeder. It will be assumed first that the called subscriber is free.

When the selection is ended, the identification impulse transmitted on the link *fl*3 propagates up to the end of the chain and makes appear in the marker the category indication of the called subscriber. This indication, as well as the availability of the called subscriber, are transmitted from the marker to the junctor driver through wire *fl*18.

When the register is scanned, it examines the junctor driver RC through wire *fl*19 and recognizes in this junctor driver the feeder number with which it is associated. Both indications which were previously received in the junctor driver—namely, the availability of the called party and his category, are then transferred from this junctor driver onto the register through that same wire *fl*19. The register, being in possession of these two items of information, is then in a position to determine whether it must or must not authorize the connection. It will be assumed first that this connection must be made. The register transmits then to the junctor driver, through wire *fl*19, a request for making a connection, the junctor driver will then retransmit this request (or order) to the marker through wire *fl*18. The order for connection, having been transmitted to the junctor driver, the sequential switch SQE will step forward onto position 6.

The register before releasing will transmit the junctor number, as well as an adequate item of information, onto a third transfer memory; so that when the junctor is scanned in its turn, during the time-period which has been assigned to it by the first scanner, it will recognize its own number—the item of information being then retransmitted from the memory to the junctor logic circuit; the latter will then request and control all the necessary functions (sending of the ringing current) and will then take in charge the continuation of all the logic operations.

When the register is scanned again, it transmits a request for the sending of ringing current—as well as feeder number, to the transfer memory MT2, and then it releases; the sequential switch SQE restores to its position 0 and all the items of information previously stored upon the various tores are cancelled.

The recognizing by the junctor of its own number in the transfer memory is realized by means of a circuit which enables to effect a comparison between position of the bistables of the junctor scanner on one hand and the item of information recorded in the transfer memory on the other hand.

When the scanner EXA comes to the feeder under consideration here, there is a correspondence between the feeder number recoded upon MT2 and the bistables of EXA; the memoy MT2 will then retransmit the sending of ringing current request to the logic circuit LGJ through wire *fl*20. The logic circuit LGJ starts testing an available junctor driver RC through wire *fl*6, and transmits to it the request (or order) for the sending of the ringing current (wire *fl*8) as well as the feeder number (wire *fl*7 and wire *fl*21). According to a process already described above, the junctor driver causes the operating of a relay *c* which sends the ringing current onto the called party, as well the ringing tone onto the caller. The order for the sending of ringing current having been transmitted to the junctor driver, the sequential switch SQJ progresses forward onto position 2.

When the called party answers, the feeding relay *dé* is looped through his telephone set and energizes by closing it contact *dé*1. The logic circuit LGJ takes notice of this closure through the medium of the reading equipment ELG, but it does not immediately start the various operations which correspond to the answer of the called party—because, it may be the case of a mere line noise; it will just make the sequential switch SQJ step forward onto position 3. When the feeder is scanned once more, the logic circuit LGJ ascertains that the contact *dé*1 is again closed; it deduces that the called party has really answered and will start, then, all the adequate operations (sending of a fee-charging impulse onto the calling subscriber's meter, the starting into operation of an automatic message accounting system, etc.). As was already mentioned above, stopping of the sending of ringing current will be caused through means placed in the feeder—such as a ringing relay of well known type. The sequential switch SQJ steps then forward onto position 4.

The call-conversation having ended, the subscribers replace their receivers and the contacts *dr*1, *dé*1, open. It will be noted that it might be interesting to delay the release; a simple way for obtaining such a result consists in utilizing a single detecting device such as the one in FIG. 3. When the logic circuit LGJ notices that one of the contacts *dr*1 or *dé*1 is open, it switches the corresponding signalling onto the detecting device. The latter, having registered a number of openings higher than 12, for instance, the logic circuit LGJ starts the various operations relating to the release—as much caller side as called party side. According to a variant it is possible to delay the release by means of a well known system of cams.

The logic circuit LGJ tests an available junctor driver and transmits to it an order for the releasing of the selection chain—caller's end—as well as the feeder number; the sequential switch SQE will be progressing forward, then onto position 5. The junctor driver starts then a new identification operation upon the selection chain—caller's end. This operation is made necessary due to the fact that in the selection chain considered here, the various connecting electro-magnets of the multi-selectors hold by mere remanence and they should be located before delivering to them a de-magnetising current. The order for releasing is then re-transmitted from the junctor driver to the marker through wire *fl*18. In order to make sure of the release of the selection chain—calling end—the logic circuit may for instance scan a contact (not shown on figure) which has been ordered by the primary selector associated with calling end of the feeder; when this selector is dis-connected, the said contact restores to rest condition and the logic circuit LGJ makes the sequential switch SQJ step forward onto position 6.

When the feeder is again scanned, the logic circuit LGJ orders the release of the selection chain—called party end, according to the same operating process described above. Then, the sequential switch SQJ restores to its rest condition and the feeder is released.

In case the called party is busy, the marker will inform the register of it through the medium of the junctor driver. The register will then start the releasing, as already mentioned above, of the two selection chains; as per a well-known process, the subscriber's line equipment remains alone in seized condition and sends the busy condition tone to the calling subscriber. According to a variant the junctor driver will energize, inside the feeder, a relay *c* which sends the busy tone.

Figures 5, 6:
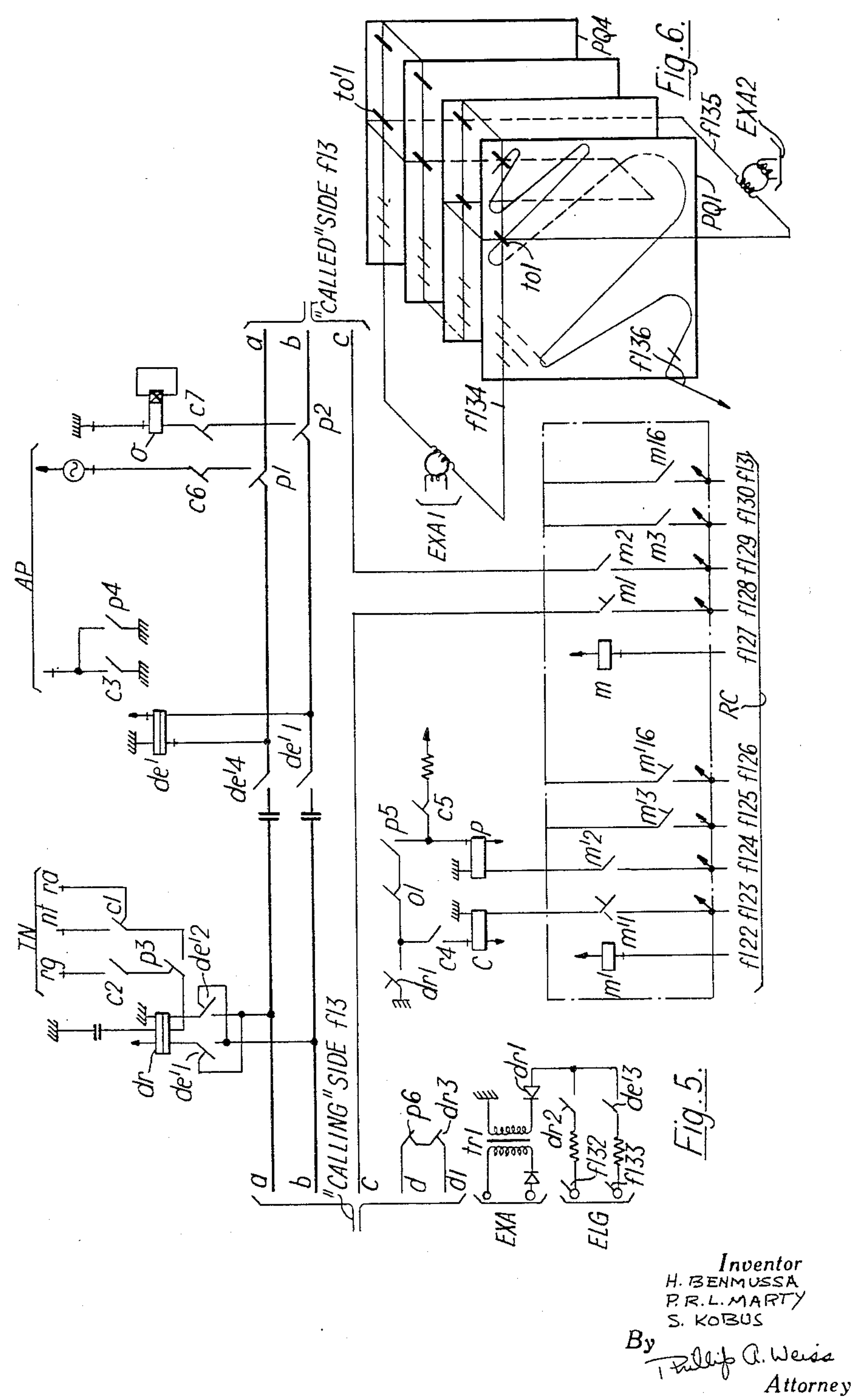
FIGURE 5 shows the schematic diagram of the local junctor or feeder.
FIGURE 6 shows a magnetic memory using ferrite tores distributed along several planes.

A description will now be given, by referring to FIG. 5, of the operating process of local junctor or feeder. In this description, the contacts associated with a given relay are designated by means of the same reference sign as the one of the relay, followed by one of the digits 1 to 9.

When the feeder is available, those various relays are in their rest condition, and there is metallic-continuity between wires *d* and *d*1 through the contacts *p*6 and *dr*3.

The connection being made between calling subscriber and feeder, the feeding relay *dr* energizes through the following circuit; battery, left hand winding of *dr*, rest contact *dé*1, wires *a* and *b* looped through the calling subscriber's telephone set, rest contact *dé*2, right hand winding of *dr*, earth. In *dr*3, it opens the availability circuit; in *dr*2, it prepares the sending of an impulse onto reading equipment ELG.

When the scanner EXA arrives on the feeder, an impulse is transmitted through the transformer *tr*1, the diode *di*1, and the contact *dr*2, onto reading equipment ELG. The logic circuit may then ascertain, by means of this reading equipment, that the feeder is in seized condition.

In order to transmit an order to the feeder, the junctor driver RC will operate in two periods. In the first place it will energize a relay *m* or a relay *m'* common to a subgroup of 8 feeders. In *m*1 and *m*2, the relay *m* prepares the reception of the order upon the feeder considered here; in *m*3 . . . *m*16, it prepares the reception of the other upon the 7 other feeders of the sub-group. The relay *m'* fills up similar functions. Then, the junctor driver transmits the order along one of the wires *fl*23 . . . *fl*26, *fl*28 . . . *fl*31. The wire *fl*28 is used for the identification—calling end; the wire *fl*29 for the identification—called party end; and the wires *fl*23, *fl*24 for the various sending-of-tone orders. The wires *fl*23 . . . *fl*26, *fl*28 . . . *fl*31 are multiplied upon the homologous contacts of all the relays *m* and *m'*.

The feeder being in seized condition, it is essential to effect an identification operation so as to know the category of the calling subscriber and to communicate it to the register. With that aim in view, the junctor driver RC will first energize the relay *m*, and then will generate an identification positive-impulse along wire *fl*28; this impulse is transmitted along the third wire of the link *fl*13—calling end, and this will cause the required identification. Then the junctor driver opens the circuit of wire *fl*27; and the relay *m* releases.

For sending the dialling tone, the junctor driver RC energizes the relay *m'*, then applies a battery onto wire *fl*23. The relay *c* energizes in its turn. In *c*4 and *dr*1, it completes a holding circuit for itself; in C3, it orders the starting into operation of the ringing machine AP; in *c*2, it closes the "trunk" dialling-tone-circuit (generator TN and wire *rg*) through the middle winding of caller's *dr* feeding relay. The subscriber receives this tone by induction.

When the calling subscriber dials, the relay *dr* operates. At the beginning of the first impulse, it opens in *dr*1 the holding-circuit of relay *c*, this will put an end to the sending of the dialling tone. In *dr*2, it effects breaks upon wire *fl*32, so as to enable the reading of its own position when the feeder is scanned by scanner EXA. The telephone number dialled is then transmitted from junctor logic circuit onto the register logic circuit—as was already indicated above.

If the telephone number corresponds to a local call, it is necessary to undertake an identification so as to know the identity of the selector associated with the called party end of the feeder in order to mark it at one of the terminals of the selection chain. With this aim in view, the junctor driver energizes first the relay *m*, then generates an identification-impulse along wire *c* of link *fl*3—called party side. Then, the relay *m* releases.

When the selection of the called subscriber is ended, the junctor driver energizes first the relay *m'*, and then the relay *p*. In *p*5, *o*1 and *dr*1, the relay *p* completes a holding-circuit for itself; in *p*4, it causes the starting into operation of the ringing machine; in *p*1 and *p*2, it closes the sending-of-ringing-current circuit:generator AP, contacts *c*6 and *p*1, wire *a*, link *fl*3 called-party-side, wire *b*, contacts *p*2 and *c*7, relay *o*, earth. The relay *o*, having its right-hand winding short-circuited, remains indifferent to the ringing alternating-current. In *p*3, the relay *p* closes the ringing-tone circuit upon the middle-winding of relay *dr*:tone generator TN, wire *ra*, contacts *c*1 and *p*3.

When the called subscriber answers, his line is metallic-looped, and the relay *o* energizes under the effect of the D.C. current superposed on ringing alternating-current. In *o*1, it opens the holding circuit of relay *p* which releases. The latter puts an end to the sending of ringing-current and ringing-tone. Through its makes contact *p*2, it opens the circuit of relay *o* which releases; through its rest contacts *p*1 and *p*2, it loops the feeding relay of called party *dé* on the latter's telephone set. The relay *dé* energizes. In *dé*1 and *dé*2, it reverses the polarities of the feeding battery-calling end; in *dé*3, it closes the circuit of wire *fl*33 so as to enable the reading of its own position by the equipment ELG; in *dé*24 and *dé*25, it establishes the connection between the link *fl*3—calling end, and the link *fl*3—called party end.

The two subscribers are in conversation through the wires *a* and *b*.

When the calling subscriber replaces his receiver, the relay *dr* releases, and the contact *dr*2 is opened, thus enabling the logic circuit to take notice of his ringing-off and to order the releasing of the selection chain—calling side. When the called party in his turn replaces his receiver, the relay *dé* releases, the contact *dé*3 is opened, thus enabling to notify the logic circuit—the latter then releases the selection chain, called-party side.

When the calling subscriber dials the office code characterizing a national call, and that the register is ready to receive the remainder of the telephone number, it informs the junctor driver. The latter energizes first the relay *m'*, then the relays *c* and *p*. The "national" dialling tone is transmitted to the caller through wire *nt* and make contacts *c*1 and *p*3. When the subscriber dials, the contact *dr*1 opens, and this causes the releasing of relays *c* and *p*. The sending of the tone stops.

The memories are set out on little plates or similar stands arranged as per square shaped matrices, and to group these little plates side by side according to approximately parallel levels, and to place the memories assigned to one same equipment according to a straight line—a first elementary scanner preparing the reading of the memories of a given row in all the plates; a second elementary scanner preparing the reading of memories of a given column in all the plates; so that, for a given position of both scanners, reading can be effected at the same time of all the memories of one same equipment; enabling thus the logic circuit to fulfill its mission the square configuration of the matrices enabling to scan a maximum number of memories for some given scanners.

When the memories of one same equipment are too numerous to be arranged according to a same straight line (the case of a register), they are distributed according to several lines; and for a given position of the scanners, all the memories of a same line are read at the same time; the logic circuit will then determine whether it is necessary to start reading the memories of all or part of the other lines and if so, it will scan, all by itself, the said lines.

Now will be described, by referring to FIG. 6, a process for realizing the magnetic memories used for the junctors or the registers. The parallel plates PQ1 . . . PQ4 bear tores *to*1 arranged accoding to a matrix comprising horizontal lines (rows) and vertical (columns). On each plate, any one tore is characterized by its position or "address." In the most simple case, which is the case of the feeder, 4 tores *to*1 . . . *to*'1 are enough for constituting the sequential switch; these four tores are distributed upon the four plates PQ1 . . . PQ4 but occupy the same "adress" on each one of them; they are therefore arranged as per a straight line perpendicular to the various plates.

In order to scan these tores, two elementary scanners EXA1, EXA2 are used. When EXA1 occupies a given position, an electrical characteristic is applied to a wire such as *fl*34, thus preparing the reading of all the tores placed along a given row in the various plates. Likewise, when EXA2 occupies a given position, an electrical characteristic is applied to a wire *fl*35, thus preparing the reading of all the tores placed along a given column in the various plates. Consequently, when the two elementary scanners happen to be each in a given position, the reading is started of the four tores *to*1 . . . *to*'1 occupying the same address on the various plates. A reading wire *fl*36 is provided per plan, the said wire will cross all the tores of this plan. It is understood, thus, why it is possible to read simultaneously the four tores which constitute the sequential switch of a given feeder.

As shown on the figure, the plates have approximately the shape of a square, and this enables to place the same number of tores upon a row or a column. In such condition; it is possible to scan a maximum number of cores for a given number of positions of the scanners. Thus is realized an important saving in equipment.

In the case of more complicated units, such as outgoing junctors, incoming junctors or registers, a higher number of plates is provided, but the tores of a same equipment are too numerous to be arranged in a single line; in other words, it is essential that several addresses be provided for a same equipment. When the two elementary scanners happen to be each in a given position, the reading is started of all the tores of the corresponding address. The logic circuit determines then if it is necessary to read the tores of the other addresses. In the affirmative case, the said addresses are scanned in succession by means of the logic circuit.

As was mentioned above, the register may have to transmit to the junctor an item of information which remains recorded on the tores of this junctor, until they be read by the logic circuit LGJ (FIG. 1) in order to be scanned in a adequate manner. This case will present itself when the register, before releasing, notifies the junctor that it must take in charge the continuation of operations by beginning to send the ringing current to the called party. It was the habit to use then a transfer memory MT2. Now will be described a varient process of realization of the invention by referring to FIG. 7, which will enable to transmit items of information from the register to the junctor without calling upon the help of a transfer memory.

According to another embodiment of the invention there is assigned to each group of junctors one or several electronic scanners controlled by bistable circuits set up into binary counters—enabling thus the junctor logic circuit to work successively for all the junctors of the group; but, during this working period the scanners are ony active, that is to say, allowing reading or recording operations, for only a fraction of time-period of their passage on a junctor; the period-of-time, thus left available, will be put to use by the registers for sending the codes characteristic of the junctors which are associated with them; thus, controlling the instantaneous orientating of the one or several scanners onto those junctors, and enable the exchange of items of information between junctors and registers suitable measures being then provided for putting out of service the junctor logic circuit at the instance under consideration here.

In order to scan the various junctors of a group, use is made of two scanners EXC, EXD, which have access—the first one to the ferrite tores *to*1 and the second one to the contacts *dr*1, *dé*1. The use of two distinct scanners enables to obtain different reading periods for the cores and for the contacts. The scanner EXC can be acted upon by means of codes originating either from the bistable circuits DCO, or from the register (wires *fl*17 and *fl*11). The codes emitted—as much by the bistable circuits DCO as by the register, are routed onto the scanner EXC through gate "OR" *pt*7. The scanner EXD is arranged in likewise manner; it can be orientated either by the bistable circuits DCO, or by the register, through a gate "OR" *pt*6.

Figure 8:
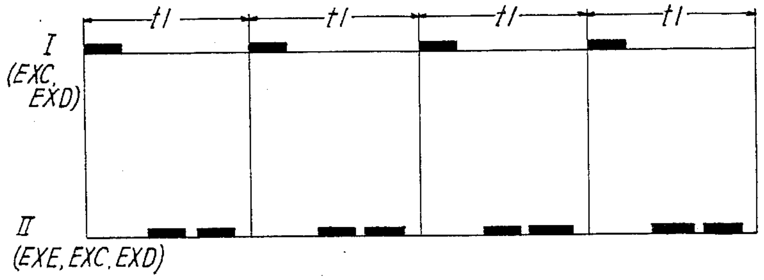
FIGURE 8 shows a time diagram of the operation of the various scanners applicable in the case of the variant in FIG. 7.

Under control of the bistables circuits DCO, the two scanners EXC and EXD advance step by step so as to serve all the junctors of the group, the logic circuit LGJ will be working successively for the account of each one of them. In this operating process, the scanners are only active—that is to say they enable reading and recording operations, for only a fraction of the period of their passage upon each junctor; as shown in I on the diagram of FIG. 8. Those time-periods thus left available are put to use for receiving the codes from the registers associated with the junctors—as shown in II on the diagram. As was mentioned in the first mode of realizing the invention, a junctor and two registers are scanned during each time-period *t*1, in order to obtain a cycle—the shortest possible—for a number of given registers. With the aim of simplifying FIG. 8, the difference was not taken into consideration between the scanning durations of EXC and EXD.

Under such conditions, there is only but one contact *dr*1 and one contact *dé*1 per junctor; likewise, there is no longer but a single gate "AND" *pt*1 giving access to the transmission relay *i*, instead of the two gates *pt*1 and *pt*'1 of FIG. 1; but on the other hand, a gate "OR" *pt*5 has been added, onto which the wires *fl*4 and *fl*'4 finish up.

Figure 7:
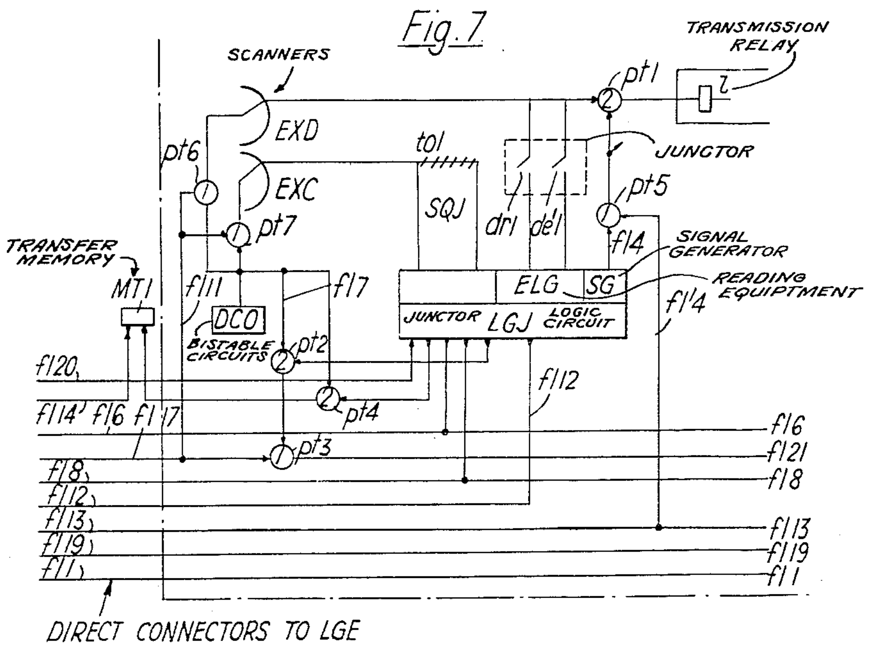
FIGURE 7 shows a variation of the system of FIG. 1 capable of transmitting information from register to junctor without having to call for a transfer memory.

The transfer-memory MT2 which is represented in FIG. 1, is eliminated in the mode of realizing the invention shown in FIG. 7; the wire *fl*20, used by the junctor logic circuit LGJ for receiving items of information from the register, is connected directly to the logic circuit LGE.

With such an arrangement, the junctor logic circuit LGJ operates in the same conditions as in the case of the mode of realizing the invention shown in FIG. 1. It will just be noted, however, that the control orders originating from the signalling equipment SG are transmitted to the emitting relay *i* through wire *fl*4, the gate "OR" *pt*5 and the gate "AND" *pt*1 unblocked by the scanner EXD.

When a register sends along wire *fl*17 the code characteristic of the junctor with which it is associated, the two scanners EXC and EXD will immediately start orientating themselves upon the junctor considered here. A master clock, which determines the time-periods of operation assigned respectively to the junctors logic-circuits and to the registers logic circuits—such as shown on FIG. 8, puts out of service the logic circuit LGJ by any appropriate means.

In case the register sequential switch SQE happens to be upon a position corresponding to the reading of one of the contacts *dr*1, *dé*1, this contact is read by the equipment ELG and the result of this reading is re-transmitted to the register through wire *fl*12.

In case the register-sequential switch SQE happens to be on a position which corresponds to the transmission of an item of information onto the junctor, this item of information is directly received upon the sequential switch SQJ through the wire *fl*20. This switching unit progresses forward onto a position which characterizes the item of information received. The function of the register is then terminated. Then, when the scanner EXC, under control of DCO, reaches upon the junctor considered here, the logic circuit LGJ takes notice of the item of information recorded upon the sequential SQJ.

Finally, when the register has to act upon the emitting relay *i*, it does same through: the wire *fl*13, the wire *fl'*4, the gate "OR" *pt*5 and the gate "AND" *pt*1 unblocked by the scanner EXD.

While the entire above principles have been described in connection with specific apparatus, it is to be clearly undrstood that this description is made only by way of example and not as a limitation to the scope of the present invention. Several other embodiments can be realized. It is possible, for instance, to replace the ferrite tores by memories of a different type such as ferro-electric memories; to modify the schema of the feeder; to provide other scanners, etc. There is no preventing this invention's present system from operating in liaison with other selection chains than those mentioned at the beginning of the present description. In particular, it is to be noted that the various numerical data have only been given as an example, in order to facilitate understanding the operating process of this invention, and are therefore liable to vary with each special case.

We claim:

1. An automatic telephone switching system comprising a plurality of subscriber stations, line circuits associated with each of said stations, register means associated with a plurality of said line circuits, connection network means comprising a plurality of multi-selector switches providing a plurality of communication paths for linking calling ones of said subscriber stations to called ones of said subscriber stations, junctor means consisting of relays for interconnecting said multi-selector switches and signal relays for controlling signalling in said calling and called subscriber stations, marking network means having a plurality of analogous paths that correspond to said communication paths, said marking network means operated responsive to directive signals from said calling station for marking said calling line circuit and said called line circuit, means for transmitting pilot signals from said marked calling line circuit toward said marked called line circuit and from said marked called line circuit toward said marked calling line circuit through all available ones of said corresponding paths, selector means comprising means for progressively blocking a part of said available corresponding paths, said progressive blocking leaving only one corresponding path selected, means responsive to said selection of said one corresponding path for switching through said connection means to link said calling station to said called station over a communication path analogous to said selected corresponding path, sequential switch means comprising a group of memory means associated with each junctor for instantaneously indicating the state of operation of said associated junctor, and logic circuit means common to groups of said junctors operated responsive to said indications for controlling said junctors and said sequential switch means.

2. In the automatic telephone switching system of claim 1 delay means in said junctor for holding said junctor for two successive scans by said sequential switch responsive to a holding signal from said logic circuit.

3. In the automatic telephone switching system of claim 1 junctor driver means common to a group of junctors operated responsive to a driver signal received from said logic circuit for storing a particular junctor number, hunting for the particular junctor and transmitting the driver signal to said particular junctor.

4. In the automatic telephone switching system of claim 3 wherein said registers comprise register sequential switch means for indicating the state of operation of said register and call information recording means and register logic means common to a group of registers for controlling said register sequential switch means and said junctor responsive to information read out of said call information recording means.

5. In the automatic telephone switching system of claim 4 comprising transfer memory means for communicating a junctor number to a register when said junctor calls for said register, gate circuit means and electronic scanning means for transferring said number of said transfer memory through said gate circuit means.

6. In the automatic telephone switching system of claim 5, register scanning means for scanning said registers containing junctor numbers, and junctor scanning means for scanning said signal relay contacts in said junctor whereby information can be exchanged between said junctor logic circuit and said register logic circuit.

7. In the automatic telephone switching system of claim 6, and means for assigning time period positions to said junctor scan means.

8. In the automatic telephone switching system of claim 7, and means for comparing said scanner means position and information in said junctor memory means.

9. In the automatic telephone switching system of claim 8 a first elementary scanner associated with a plurality of junctor drivers for controlling said junctor drivers and a second elementary scanner associated with each junctor driver for translating the condition of said junctor drivers and transferring this condition to said associated junctors.

10. In the automatic telephone switching system of claim 1 wherein there is provided a first junctor scanner having access to a group of said junctor memories, a second junctor scanner having access to said junctor relays, whereby said memories and said relays can be scanned at different time periods and said register means controlling said first and second scanners.

References Cited by the Examiner

UNITED STATES PATENTS

| | | | |
|---|---|---|---|
| 2,333,179 | 11/1943 | Holden | 179—18 |
| 2,582,959 | 1/1952 | Bruce et al. | 179—22 |

ROBERT H. ROSE, *Primary Examiner.*

WALTER L. LYNDE, *Assistant Examiner.*